United States Patent [19]

Chefalas et al.

[11] Patent Number: 5,319,721
[45] Date of Patent: Jun. 7, 1994

[54] METHODS AND APPARATUS FOR EVOLVING A STARTER SET OF HANDWRITING PROTOTYPES INTO A USER-SPECIFIC SET

[75] Inventors: Thomas E. Chefalas, Jackson Heights; Charles C. Tappert, Ossining, both of N.Y.

[73] Assignee: International Business Machines Corporation, Armonk, N.Y.

[21] Appl. No.: 868,369

[22] Filed: Apr. 14, 1992

[51] Int. Cl.$^5$ .............................................. G06K 9/00
[52] U.S. Cl. ...................................... 382/13; 382/14; 382/15
[58] Field of Search ................... 382/3, 13, 14, 15, 10, 382/24, 16, 37, 39; 395/20, 23

[56] References Cited

U.S. PATENT DOCUMENTS

| | | | |
|---|---|---|---|
| 4,177,448 | 12/1979 | Brayton | 340/146.3 |
| 4,491,965 | 1/1985 | Yoshimura | 382/57 |
| 4,561,105 | 12/1985 | Crane et al. | 382/13 |
| 4,573,196 | 2/1986 | Crane et al. | 382/13 |
| 4,654,873 | 3/1987 | Fujisawa et al. | 382/9 |
| 4,718,102 | 1/1988 | Crane et al. | 382/13 |

(List continued on next page.)

FOREIGN PATENT DOCUMENTS 0540869 9/1992 European Pat. Off. .

OTHER PUBLICATIONS

Morasso, P. et al.; "Recognition Experiments of Cursive Dynamic Handwriting with Self-Organizing Networks"; *Pattern Recognition*, vol. 26, No. 3, 1993; pp. 451-460.

Karnaugh et al.; "Prototype Pruning for Elastic Matching Symbol Recognition"; *IBM Technical Disclosure Bulletin*; vol. 24, No. 9, Feb. 1982; pp. 4522-4523.

"Speed, Accuracy, Flexibility Trade-Offs in On-Line Character Recognition", C. C. Tappert, IBM Research Division, RC 13228 (#59158) Oct. 28, 1987, pp. 1-20.

"Adaptive On-Line Handwriting Recognition", C. C. Tappert, IEEE Seventh International Conference on Pattern Recognition Proceedings, Jul. 30-Aug. 2, 1984, Montreal, Canada, pp. 1004-1007.

"Online Prototype Editing Improves Handwriting Recognitition", IBM Technical Disclosure Bulletin, vol. 34, No. 3, Aug. 1991, p. 222.

"Fast Labelling by Precomputation of Inter-Prototype Distances", IBM Technical Disclosure Bulletin, vol. 29, No. 5, Oct. 1986, pp. 2345-2346.

(List continued on next page.)

*Primary Examiner*—Michael T. Razavi
*Assistant Examiner*—Steven P. Klocinski
*Attorney, Agent, or Firm*—Perman & Green

[57] ABSTRACT

A method for use in a handwriting recognition system, and apparatus for accomplishing the method, that generates a User set of prototype symbols. The method includes the steps of (a) inputting one or more strokes for representing a predetermined symbol; and (b) comparing characteristics of the inputted strokes to stroke characteristics associated with one or more predetermined Starter prototype symbols. If the stroke characteristics match to within a predetermined threshold, the method further includes a step of (c) averaging the characteristics of the inputted stroke or strokes with the characteristics of a corresponding one or ones of the strokes of the matching one of the Starter prototype symbols to form a User prototype symbol. Further steps include (d) storing the User prototype symbol for subsequent use; and (e) deleting one or more Starter prototype symbols of the same label as the input symbol. If the stroke characteristics do not match, the method further includes the steps of (f) storing the characteristics of. the one or more inputted strokes as the User prototype symbol for subsequent use; and (g) deleting the one or more Starter prototype symbols. A counter is maintained and deletes the Starter set only after a predetermined number of instances of the symbol have been entered by the user.

25 Claims, 10 Drawing Sheets

U.S. PATENT DOCUMENTS

| | | | |
|---|---|---|---|
| 4,724,542 | 2/1988 | Williford | 382/15 |
| 4,731,857 | 3/1988 | Tappert | 382/9 |
| 4,901,358 | 2/1990 | Bechet | 382/3 |
| 5,020,117 | 5/1991 | Ooi et al. | 382/46 |
| 5,050,219 | 9/1991 | Maury | 382/3 |
| 5,121,441 | 6/1992 | Chefalas et al. | 382/13 |

OTHER PUBLICATIONS

"Global Prototype Establishment Procedure for Handwritten Character Recognition", IBM Tech. Disclosure Bulletin, vol. 31, No. 9, Feb. 1989, pp. 114–116.

"Method that Eliminates Maverick Prototypes in On-line Handwriting Recognition", IBM Technical Disclosure Bulletin, vol. 33, No. 11, Apr. 1991, pp. 383–384.

"Resolving Handwriting Recognition Confusion by Elastic Feature Extraction", IBM Technical Disclosure Bulletin, vol. 34, No. 2, Jul. 1991, p. 123.

"On-Line Recognition of Hand-Written Characters Utilizing Positional and Stroke Vector Sequences", Ikeda et al., Proc. 4th Int. Conf. Pattern Recognition, pp. 813–815, Nov. 1978.

"Handwriting Recognition Accuracy Improvement by Majority Decision of Nearest-Neighbor Matches", IBM Technical Disclosure Bulletin, vol. 33, No. 9, Feb. 1991.

"Word Processing with On-line Script Recognition", W. Doster and R. Oed, AEG-Telefunken Research Institute, IEEE Micro, vol. 4, pp. 36–43, Oct. 1984.

"Stroke-Number and Stroke-Order Free On-Line Character Recognition by Selective Stroke Linkage Method", T. Wakahara and M. Umeda, Proc. ICTP '83, Tokyo, Oct. 17–19, 1983, pp. 157–162.

FIG. 9.c.
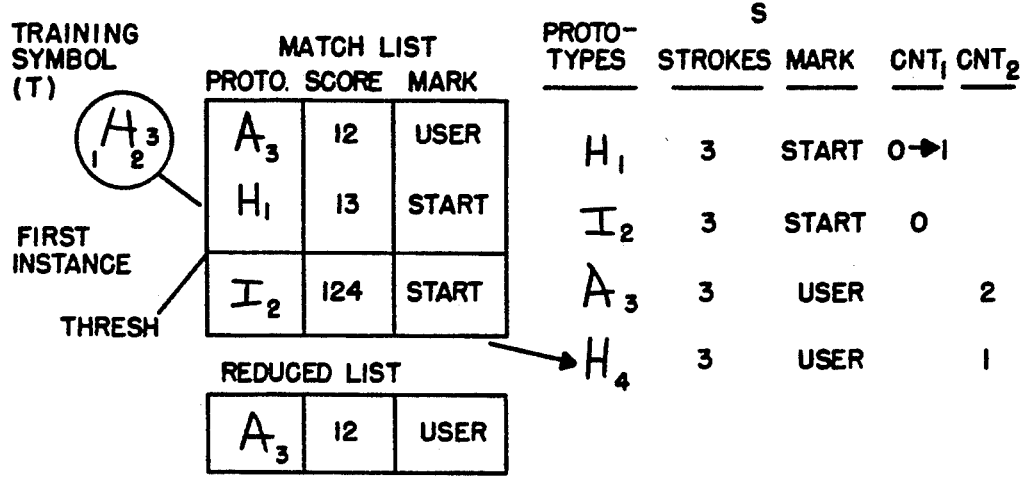
FIG. 9d.
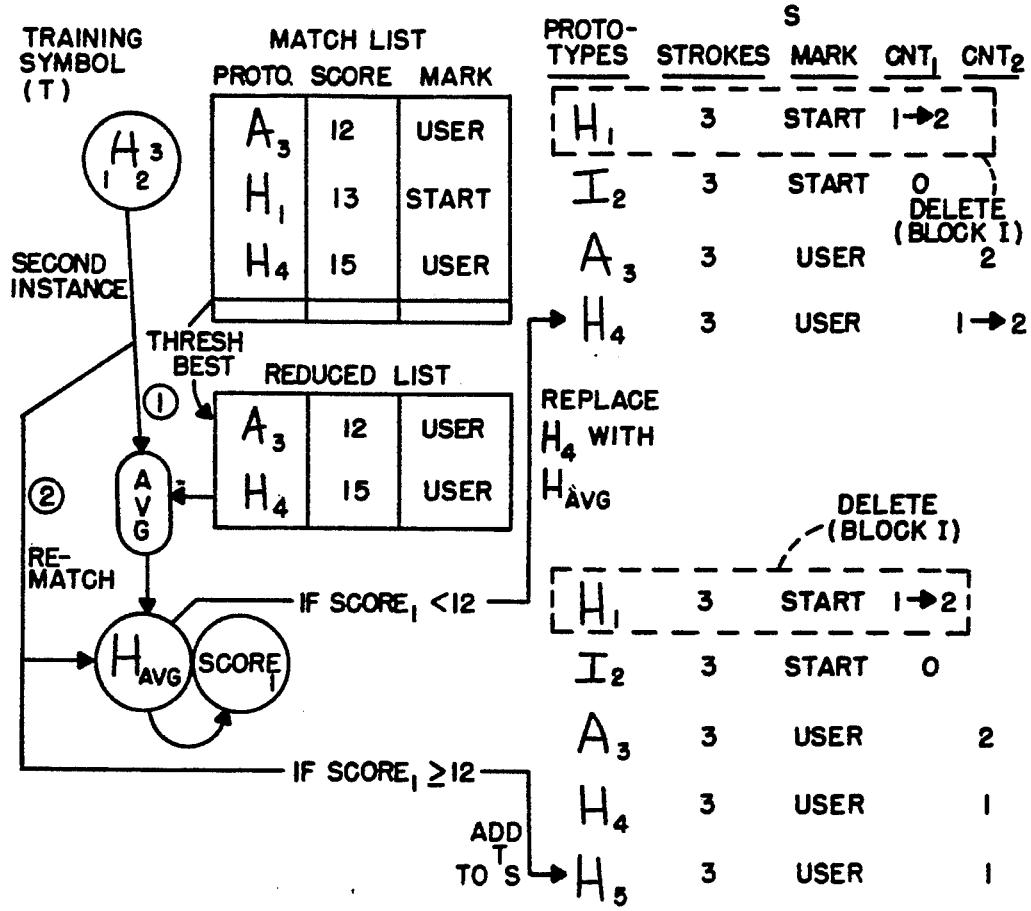

METHODS AND APPARATUS FOR EVOLVING A STARTER SET OF HANDWRITING PROTOTYPES INTO A USER-SPECIFIC SET

FIELD OF THE INVENTION

This invention relates generally to handwriting recognition systems and, in particular, relates to methods and apparatus for establishing a set of symbol prototypes.

BACKGROUND OF THE INVENTION

Symbols formed by handwriting, when traced on an electronic tablet, are represented by sequences of x-y coordinate pairs. A fundamental unit of handwriting is the stroke. A stroke is considered as a sequence of points, represented by their respective x-y coordinates. As employed herein a stroke is considered to be the writing that occurs from a pen-down to a pen-up condition of a handwriting input device. Symbols, such as letters of the alphabet and numbers, are assemblages of such strokes.

Many on-line, handwriting recognition systems employ curve matching methods to match an unknown character against prototype, or template, characters. Examples of such systems are described in the following articles: W. Doster and R. Oed, "Word processing with on-line script recognition", IEEE Micro, Vol. 4, pp. 36–43, October 1984; K. Ikeda, T. Yamamura, Y. Mitamura, S. Fujiwara, Y. Tominaga, and T. Kiyono, "On-line recognition of handwritten characters utilizing positional and stroke vector sequences", Proc. 4th Int. Jt. Conf. Pattern Recognition, pp. 813–815, November 1978; C. C. Tappert, "Adaptive on-line handwriting recognition", Proc. 7th Int. Conf. Pattern Recognition, pp. 1004–1007, 1984; C. C. Tappert, "Speed, accuracy, flexibility trade-offs in on-line character recognition", IBM Research Report RC 13228, October 1987; and T. Wakahara and M. Umeda, "Stroke-number and stroke-order free on-line character recognition by selective stroke linkage method", Proc. 4th ICTP, pp. 157–162, 1983. In general, the recognition accuracy of such prototype-based handwriting recognition systems is a function of the quality of the prototypes.

Many online, handwriting recognition systems use elastic curve matching to match an unknown character against prototype (template) characters. Examples of such systems are described in the following articles: T. Fujisaki, T. E. Chefalas, J. Kim, and C. C. Tappert, "Online recognizer for runon handprinted characters", Proc. 10th Int. Conf. Pattern Recognition, pp. 450–454, June 1990; K. Ikeda, T. Yamamura, Y. Mitamura, S. Fujiwara, Y. Tominaga, and T. Kiyono, "Online recognition of handwritten characters utilizing positional and stroke vector sequences", Proc. 4th Int. Conf. Pattern Recognition, pp. 813–815, November 1978; C. C. Tappert, "Adaptive online handwriting recognition", Proc. 7th Int. Conf. Pattern Recognition, pp. 1004–1007, 1984. Such systems usually represent each way of writing a character by a single prototype that usually is one writing of the character. This minimizes the number of prototypes and therefore the computation time for matching. The recognition system of T. Fujisaki et al, above, collects original character prototypes from a user's writing samples through a training scenario. Averaged prototypes are formed by averaging original character prototypes of the same label and shape (within a match threshold). For example, similarly-shaped A's are averaged to yield an averaged A prototype.

An article by T. E. Chefalas and C. C. Tappert, "Improved prototype establishment in a handwriting recognition system", IBM Tech. Disclosure Bulletin, Vol. 33, p. 420, January 1991 describes global and incremental averaging techniques for online handwriting recognition.

An article by J. M. Kurtzberg and C. C. Tappert, "Symbol Recognition System By Elastic Matching" IBM Tech. Disclosure Bulletin, Vol. 24, No. 6, pp. 2897–2902, November 1981, describes a technique for utilizing elastic matching to recognize symbols.

An article by C. C. Tappert, "Cursive Script Recognition System By Elastic Matching", IBM Tech. Disclosure Bulletin, Vol. 24, No. 11A, pp. 5404–5407 describes a technique for utilizing elastic matching to recognize cursive script.

An important consideration is a total number of prototypes in a prototype set. As can be appreciated, the larger the number of prototypes, the greater is the amount of time required to examine the prototype set to identify those that most nearly match an input assemblage of strokes. In general, the speed of recognition is inversely proportional to the number of prototypes in the prototype set. Also, the larger the number of prototypes the greater is the amount of memory required to store the set. A reduction in processing time and memory requirements is an important consideration in many applications, particularly in portable, battery operated handwriting input devices and/or in portable computers that employ a handwriting user interface.

A further consideration is the ease and accuracy of a transition from a system-supplied, generic set of starter symbol prototypes to a more accurate set of working prototypes that are customized, during a training session, to the handwriting characteristics of a particular user. The set of starter symbol prototypes may be designed by experts in handwriting recognition and is, by definition, robust and free of aberrant symbols (mavericks). The set of starter symbols often contains a number of possible representations of each symbol. By example, three different prototypes of the uppercase letter "A" may be provided so as to cover the case of an "A" printed with one continuous stroke, with two strokes, or with three strokes. Other forms of the letter "A" prototype may also be provided to cover different variations in stroke order and direction. As can be realized, if a given user consistently forms the letter "A" with three stokes, and consistently uses the same stroke order and direction, then the alternate "A" symbol starter prototypes are superfluous.

It is thus an object of this invention to provide methods for accurately evolving from a starter set of symbol prototypes to a working set of user-specific symbol prototypes.

It is another object of the invention to provide methods for automatically replacing a set of starter symbol prototypes with user symbol prototypes through a training operation, wherein an identity of input characters is known beforehand.

It is a further object of the invention to provide methods for accurately evolving from a starter set of symbol prototypes to a working set of user-specific symbol prototypes, and to also eliminate starter symbol prototypes from the set of working prototypes so as to reduce a total number of prototypes in the prototype set.

SUMMARY OF THE INVENTION

The objects of the invention are realized by a method, and apparatus for accomplishing the method, of generating sets of prototype symbols and strokes for use in a handwriting recognition system.

More specifically, there is disclosed a method of generating a working set of prototype symbols for use in a handwriting recognition system. The method includes the steps of (a) inputting one or more strokes for representing a predetermined symbol; and (b) comparing characteristics of the inputted strokes to stroke characteristics associated with one or more predetermined starter prototype symbols. Each of the starter prototype symbols is also comprised of one or more strokes.

If the characteristics of the inputted stroke or strokes match the characteristics associated with the one or more strokes of one of the predetermined starter prototype symbols, to within a predetermined threshold, the method further includes a step of (c) averaging the characteristics of the inputted stroke or strokes with the characteristics of a corresponding one or ones of the strokes of the matching one of the starter prototype symbols to form a working prototype symbol. The working prototype symbol is therefore comprised of one or more strokes having averaged characteristics. Further steps include (d) storing the working prototype symbol for subsequent use; and (e) deleting the one or more starter prototype symbols.

If the characteristics of the inputted stroke or strokes are found not to match the characteristics associated with the one or more strokes of one of the predetermined starter prototype symbols, to within the predetermined threshold, the method further includes the steps of (f) storing the characteristics of the one or more inputted strokes as the working prototype symbol for subsequent use; and (g) deleting the one or more starter prototype symbols.

The steps of deleting include the initial steps of incrementing a counter to record the occurrence of the step of inputting; and comparing a value of the counter to a predetermined value. If the value of the counter is less than the predetermined value, the method repeats step (a) to input one or more strokes for representing another instance of the predetermined symbol, and also performs step (b), and steps (c) and (d) or step (f), without deleting the one or more starter prototype symbols. Otherwise, if the value of the counter is equal to the predetermined value, the method performs the step (e) or (g) of deleting the one or more starter prototype symbols, and then returns to step (a).

The step of averaging preferably employs a weighted average so as to more heavily weight a contribution of the stroke characteristics of the matching one of the prototype symbols to the working, or user prototype symbol.

The step of inputting includes a step of generating strokes by a movement of a stylus relative to an electronic tablet.

The step of comparing preferably includes an initial step of performing an elastic matching technique between the inputted symbol and individual ones of the starter prototype symbols.

The teaching of the invention provides an appropriate transition from a starter set of symbol prototypes, having excellent "walk-up" recognition accuracy for a new user, to a working set of user symbol prototypes, having improved recognition accuracy tailored to a specific user. Generally, the method also provides a set of working symbol prototypes that is smaller in size than would be obtained if the starter set of prototypes were also maintained.

BRIEF DESCRIPTION OF THE DRAWING

The above set forth and other features of the invention are made more apparent in the ensuing Detailed Description of the Invention, when read in conjunction with the attached Drawing, wherein:

FIGS. 9a–9e illustrate the operation of the method of the invention for an exemplary sequence of training characters.

DETAILED DESCRIPTION OF THE INVENTION

Figure 1:
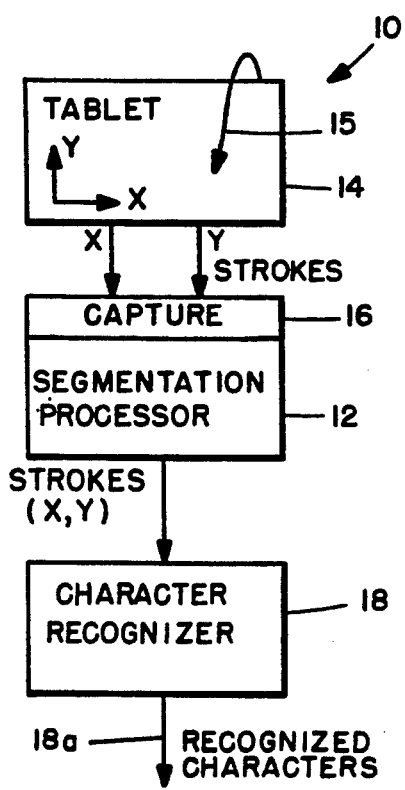
FIG. 1 is block diagram of a handwriting recognition system that operates in accordance with the invention.

Referring to FIG. 1 there is shown in block diagram form a character recognition system 10 that includes a segmentation processor 12 coupled between an electronic tablet 14 and a character recognizer 18. Tablet 14 can be any of a number of suitable commercially available electronic tablets. The tablet 14 has an associated stylus or pen 15 with which, in a pen-down position, a user forms symbols, such as block printing or script alphanumeric characters, on a surface of the tablet 14. The tablet 14 has x-axis and y-axis output signals expressive of the position of the pen 15 on an x-y tablet coordinate system. A stroke capture device 16 may be a software task which intercepts the x-y outputs from the tablet to generate x-y position pair data for the segmentation processor 12. An output of the segmentation processor 12 is data expressive of connected strokes and unconnected strokes. This output data is input to the character recognizer 18. The character recognizer 18 operates to determine an identity of a connected group of segmented strokes and has an output 18a expressive of identified symbols, such as alphanumeric characters. The present invention is directed to the operation of the character recognizer 18.

Although shown as separate functions it should be realized that the segmentation processor 12, capture device 16 and character recognizer 18 may all be embodied as program modules running upon a single data processing system. One suitable data processing system is a portable, battery operated computer wherein the tablet 14 and pen 15 are integral components for providing a handwriting user interface.

It should also be realized that the teaching of the invention is applicable to the recognition of a number of handwritten symbols, wherein a given symbol is composed of at least one stroke. By employing the teaching of the invention the system 10 may readily recognize symbols associated with written characters of various languages, and also mathematical and other types of symbols.

Figure 2:
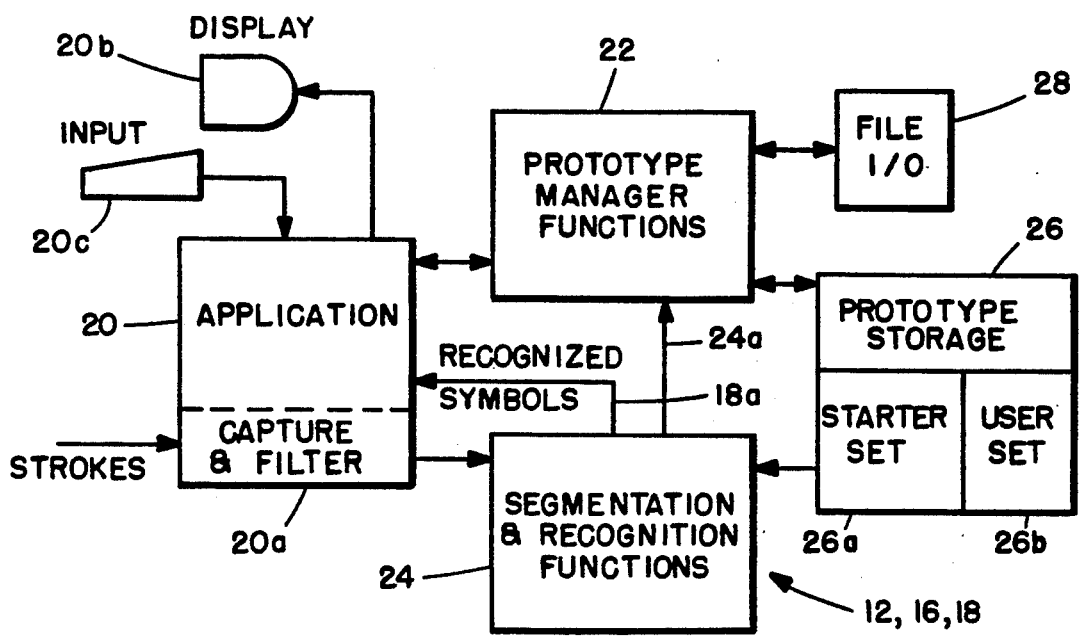
FIG. 2 is a block diagram that illustrates in greater detail the system of FIG. 1.

Referring now to FIG. 2 there is shown in block diagram form an embodiment of the system 10. A character recognition function 24 is bidirectionally coupled during use to an application program 20 to which it supplies recognized characters 18a and through which strokes from the tablet 14 are passed. Depending upon the function of the application program 20 the application program may also contain a filter 20a for selectively passing strokes to the recognition function 24. By example, for a text editing application handwritten symbols that are positioned within a body of text may be considered to be textual insertions while symbols appearing within a margin area may be considered to indicate editing functions or comments. The application 20 may pass to the recognizer 24 only the strokes associated with what is assumed to be inserted text while filtering out the strokes associated with assumed editing functions. In general, the application program 20 may be any program that utilizes or otherwise consumes the recognized symbols.

System 10 includes the aforementioned recognition function 24 that operates to compare input strokes from the segmentation processor 12 to prototype strokes and characters stored within a local, on-line prototype storage device 26, typically a RAM. The prototype storage device 26 initially includes a set of generic, or starter, symbol prototypes 26a. These starter prototypes are designed to enable an initial "walk-up" recognition capability so as to allow a new user to immediately use the handwriting recognition system 10. After training, the prototype storage device 26 contains, in place of the starter prototype set 26a, a user-specific, working set of symbol prototypes 26b.

Prototype manager 22 includes a collection of functions used for establishing the user-specific symbol prototype set 26b. The functionality of the prototype manager 22 is invoked by an application 20 employed during prototype generation and maintenance. Prototype manager 22 operates to control the prototype storage 26 and may also operate with an associated file input/output (I/O) 28 that provides access to off-line storage and retrieval of the prototype sets. Prototype manager 22 functions that are specific to the generation of the working set of user-specific prototypes 26b, from the starter set 26a, are described in detail below.

In the illustrated embodiment the application 20 functions as an operator interface to the prototype manager 22. For some embodiments of the invention, the application 20 is further coupled to an operator display terminal 20b and to an operator input device, such as a keyboard 20c.

Figure 3:
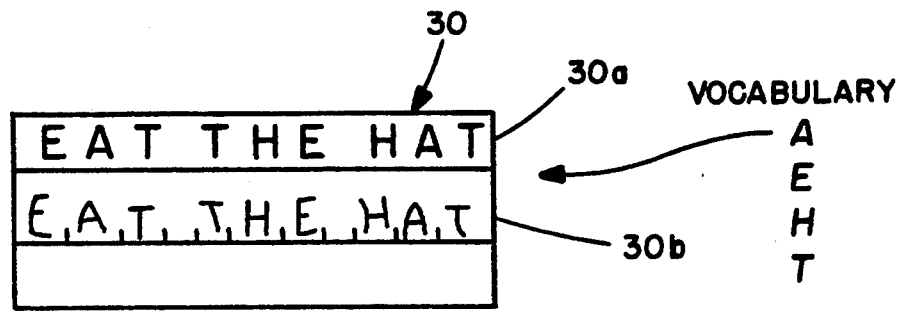
FIG. 3 depicts a training set of characters that is input to the system.

FIG. 3 depicts an example of an input training form 30 employed for providing input to the prototype manager 22. During a training session for an exemplary vocabulary, consisting of the characters "A", "E", "H" and "T", a subject is provided with a training sample 30a. The subject writes with the stylus 15 upon the tablet 14 the individual labeled symbols of the training sample 30a to create a plurality of strokes that make up handwritten characters 30b. The strokes are captured, segmented, and provided to the recognition function 24. During a typical training session the recognition function 24 inputs the strokes and performs default character recognition based on the known labels of the training sample 30a and the starter set of prototypes 26a, and provides recognized symbols 24a to the prototype manager 22 for storage and processing.

Although only a limited training vocabulary is depicted in FIG. 3, in practice a significant number of writing samples are collected from a specific user of the system 10. Complete prototype coverage is provided by training over a starter prototype set that includes all expected symbol input, and may be enhanced by also periodically updating the prototype set with additional handwriting input.

Each input character is represented by a data structure that includes information expressive of the character label, the number of strokes in the character, an identification number, a typical uppercase character height in tablet 14 coordinate units, an associated baseline value expressed in tablet 14 coordinate units, the tablet 14 resolution and sample rate, and also the number of x-y coordinate pairs, or points, associated with each stroke. The data structure also includes a plurality of x-y coordinate values, referenced to the tablet 14 coordinate system, for each of the strokes. The coordinate pair values are received from the tablet 14.

A presently preferred character matching technique is based on the elastic matching technique of a type described by Charles C. Tappert in "Adaptive on-line handwriting recognition", Proc. 7th Int. Conf. Pattern Recognition, pp. 1004–1007, 1984.

Figure 4:
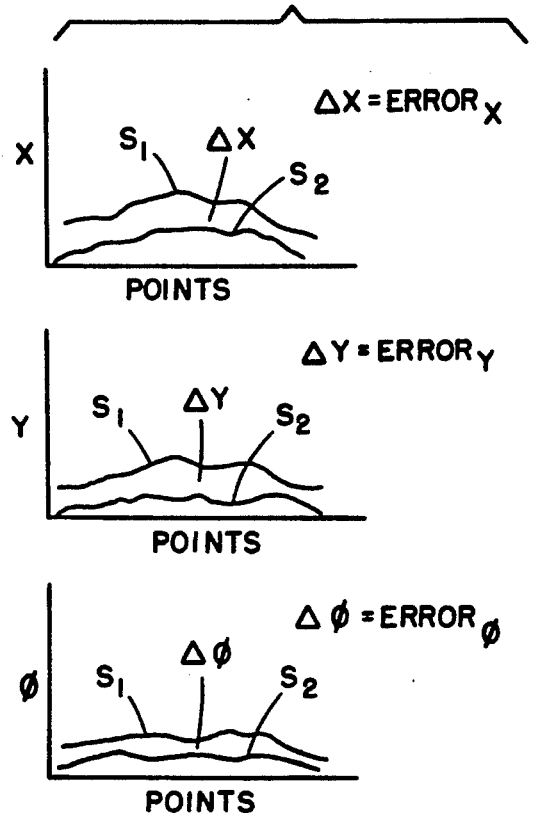
FIG. 4 graphically depicts an operation of an elastic matching technique.

By example, FIG. 4 graphically illustrates three stroke characteristics, specifically x, y and phi, plotted over a length of each of two strokes ($S_1$ and $S_2$), that are compared by the elastic matching technique. Phi is a slope angle of a tangent to the stroke curve and is obtained from the x-y data. If the difference, or error, between the two curve points exceeds an empirically determined threshold value the two strokes, and possibly the two characters of which the two strokes are constituents, are considered to be sufficiently distant from one another so as to be considered non-matching.

It should be realized that the teaching of the invention is not limited to using only the elastic matching technique described above. For example, linear matching can be employed, as can various feature extraction and statistical analysis methods.

Having described the general operation of the system 10, a description is now made of a presently preferred method for generating the user-specific working set of symbol prototypes 26b, also referred to herein as User prototype symbols.

Figure 5:
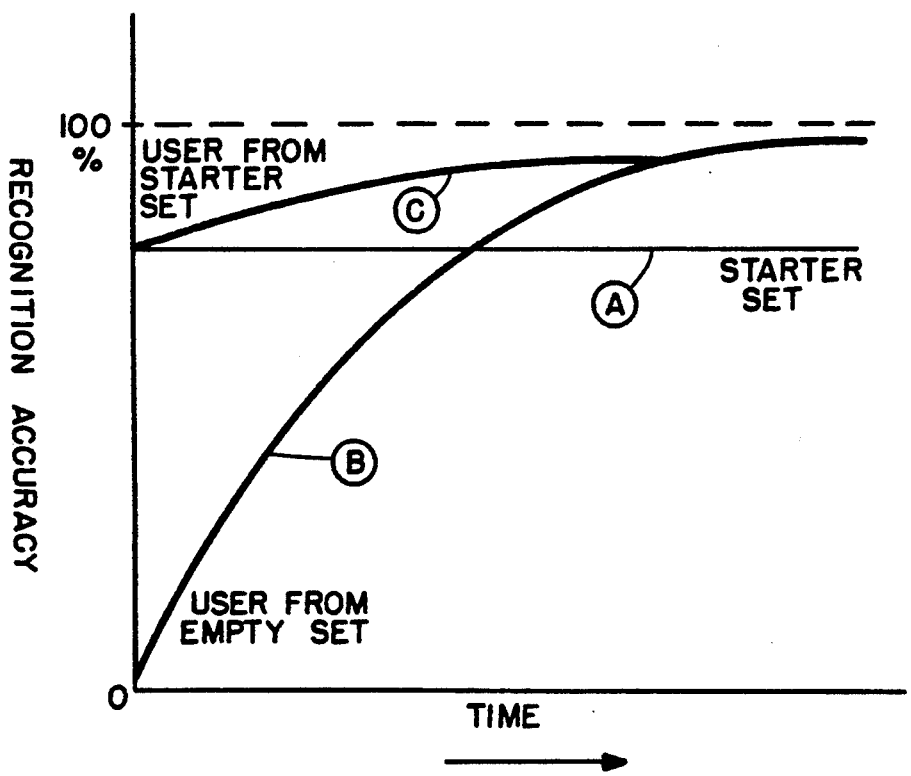
FIG. 5 is a graph illustrating the improvement in training time made possible by the use of the invention.

FIG. 5 is a graph illustrating the improvement in training time and initial recognition accuracy made possible by the use of the invention. Trace A shows the result of using only the starter set 26a, without employing any training. As can be seen, recognition accuracy begins at a relatively high level, but remains constant. Trace B shows the result of training the user prototype set 26b when beginning with an empty set (no starter set 26a). For this case, recognition accuracy is initially very poor, but eventually may asymptotically approach 100%.

Trace C illustrates the effect of the use of the method of the invention. At time zero recognition accuracy is equal to the accuracy afforded by the starter set 26a, and the recognition accuracy improves over time as additional training occurs so as to asymptotically approach 100%.

Figure 6A:
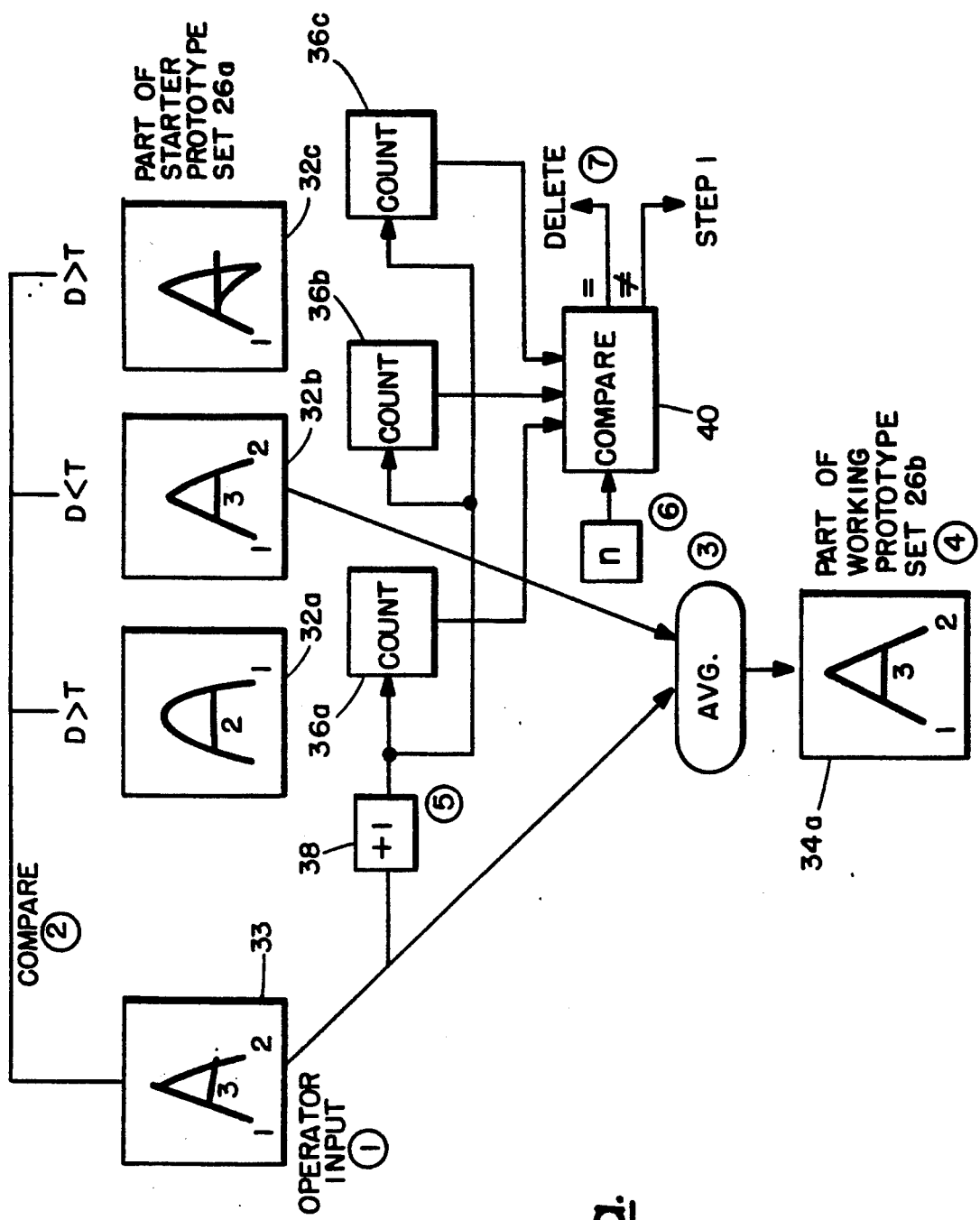
FIG. 6a and 6b diagrammatically illustrate the operation of a method of the invention.
Figure 6B:
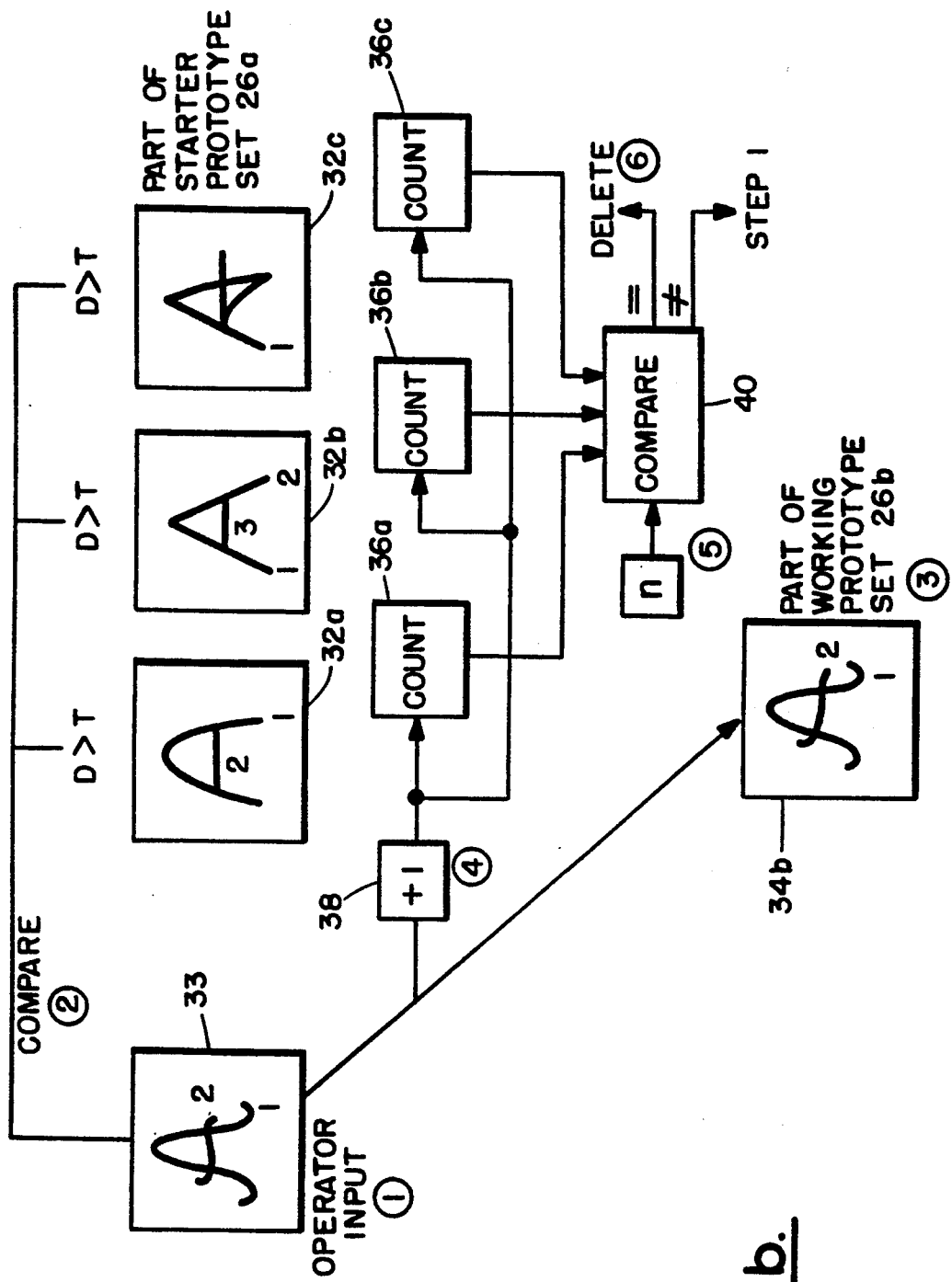

By way of introduction, and referring to FIGS. 6a and 6b, there is illustrated a simplified example of the operation of the invention.

As an example, the starter prototype set 26a (FIG. 2) includes three character prototypes for the upper case letter "A". Specifically, the starter prototype set 26a includes a two stroke "A" prototype 32a, a three stroke "A" prototype 32b, and a one stroke "A" prototype 32c.

In step 1, the operator is prompted to enter, via the tablet 15 and pen 15, a sample 33 of the uppercase letter "A", as in FIG. 3.

In step 2, the constituent strokes of the sample character 33 are compared, by the elastic matching technique referred to above, to the constituent strokes of each of the starter prototypes 32a, 32b, and 32c. A difference (D) between the strokes of the sample character 33 and the strokes of each of the starter prototypes 32a, 32b, and 32c is compared to a threshold value (T).

In FIG. 6a the operator entered a three stroke "A" which was sufficiently close (D<T) to the three stroke "A" prototype 32b to be considered a match.

In step 3 the constituent strokes of the sample "A" and the constituent strokes of the starter prototype 32b are averaged together to form a new working prototype 34a which is stored, in step 4, in the user set of working prototypes 26b.

In step 5 counters 36a, 36b, and 36c are incremented by a +1 increment clock 38. The number of counts in the counters 36a-36c indicates a number of instances of the sample uppercase "A" character that have been inputted by the user during the training session.

In step 6 the value of the counters 36a-36c is compared to a predetermined value (n) by a comparator 40. If the value of the counters 36a-36c is less than (n), the operator may be prompted to enter a further sample character, and steps 1-6 are repeated (or steps of 1-5 of FIG. 6b, if the next sample character does not match one of the starter prototypes).

If the value of the counters 36a-36c is found to be equal to (n) at step 6, then at step 7 the starter prototypes 32a, 32b, and 32c are deleted, thereby reducing in the system 10 the number of "A" prototypes from four to one, the working prototype 26b. The operator may or may not enter further instances of the sample uppercase 'A'.

FIG. 6b shows the operation of the method for the case where the user-entered sample character does not match, within the threshold T, one of the starter prototypes 32a, 32b, or 32c.

Specifically, the operation of the method is the same as in FIG. 6a for steps 1 and 2. However, in FIG. 6b the user entered a two stroke "A" which was not sufficiently close (D>T) to any of the Starter prototypes 32a-32c to be considered a match.

In step 3, the sample "A" character 33 is written as the working prototype 34b to the user set of working prototypes 26b, and in step 4 the counters 36a, 36b, and 36c are incremented by the +1 increment clock 38. In step 5 the value of the counters 36a-36c is compared to the predetermined value (n) by the comparator 40. If the value of the counters 36a-36c is less than (n), the operator may be prompted to enter a further instance of a sample character, and steps 1-5 are repeated (or steps of 1-6 of FIG. 6a, if the next sample character does match one of the starter prototypes).

If the value of the counters 36a-36c is found to be equal to (n) at step 5, then at step 6 the starter prototypes 32a, 32b, and 32c are deleted, thereby reducing in the system 10 the number of "A" prototypes from four to one.

In the method of FIG. 6a the step of averaging is preferably a point by point weighted average that more heavily weights the contribution of the starter prototype 32b. This technique thus tends to form the working "A" prototype 34a such that it retains a significant portion of the characteristics of the "known good" starter "A" prototype 32b. As an example, the weighting may be such that the contribution of the starter prototype 32b to the working prototype 34a is five times that of the sample prototype 33. A character and stroke averaging technique may be employed such as is described in commonly assigned U.S. patent application Ser. No. 07/586,843, filed Sept. 21, 1990, entitled "Robust Prototype Establishment in an On-line Handwriting Recognition System" by T. E. Chefalas T. Fujisaki J. Kim and C. Tappert, now U.S. Pat. No. 5,121,441, issued Jun. 9, 1992. Reference is also made in this regard to commonly assigned and allowed U.S. patent application Ser. No. 07/782,215, filed Oct. 24, 1991, entitled "Elastic Prototype Averaging in Online Handwriting Recognition", by T. E. Chefalas and C. Tappert.

The value of the threshold (T) and the value of (n) may best be empirically determined for a given application. Preferably, the threshold (T) is established so as to favor the averaging of the user inputted symbol 33 with one of the starter prototype characters. This results in the establishment of the working, user-specific prototype set 26b so as to incorporate a significant component of the "known good" features of the starter prototype set 26a. The value of (n) is a function of the time allotted to training the prototype set for a given user, and possibly other criteria, such as an expected familiarity of the intended class of users with the use of the electronic tablet 14 and stylus 15, and/or an anticipated age of the intended class of users.

Figure 7:
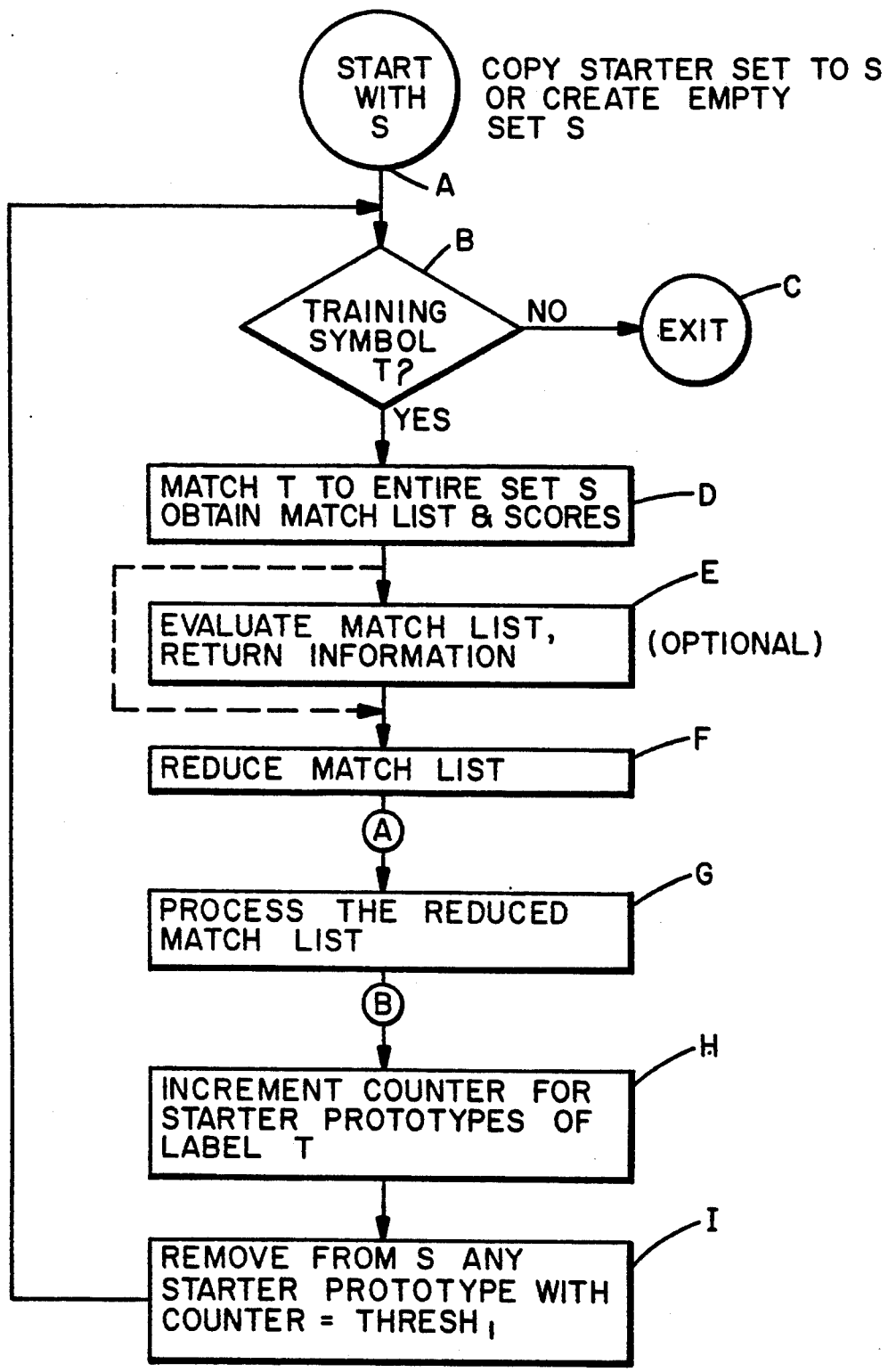
FIG. 7 is a generalized flow chart of the method of the invention.

FIG. 7 is a flowchart that illustrates in greater detail the method of the invention.

At Block A, the method begins with a prototype set S by copying the starter set 26 to S, with each prototype marked 'starter'. Alternately, an empty (null) set is created and designated as S.

At Block B a determination is made if there is a training symbol (T) to learn. If no, then the method exits at Block C. If yes, the method executes Block D.

At Block D the training symbol T is matched against all elements of S through, by example, the elastic matching technique referred to above. The result is a Match List of symbols and corresponding Match Dissimilarity Scores (Score). The smaller the Match Dissimilarity Score, the smaller is the difference between T and the corresponding element of S. A score of zero indicates a perfect match between T and the corresponding element of S..

An optional step (Block E) may be performed to return information regarding the Match List to a calling program and/or the user. The execution of this step provides feedback to the user as to the progress of the training session and to how the system is adapting to the user's handwriting.

At Block F the Match List is reduced in size, if possible, by removing entries in accordance with the criteria:

---

Remove Match List Entry having Score > Threshold (THRESH); and (optionally)

-continued

Remove Match List Entry marked 'Starter'.

It should be noted that if only the first criteria is employed, then Training Symbols (T) are merged into the set of Starter prototype symbols 26a. For example, some T will be averaged or otherwise combined with Starter prototypes. The execution of Block F results in the creation of a structure referred to as a Reduced Match List. It should be realized that there may be some cases wherein the execution of Block F results in a Reduced Match List having the same number of entries as the Match List.

Step G processes the Reduced Match List, in a manner described in detail below with regard to FIGS. 8a, 8b, and 9a-9e.

At Block H the counters 36 (FIGS. 6a and 6b) are incremented for all Starter symbol prototypes in S having the same label as T. For example, if the label of T is 'A', then all Starter symbol prototypes in S having the label 'A' are incremented by one.

At Block I there is removed from S all Starter prototypes having a counter value that equals a second threshold (THRESH$_1$), which corresponds to (n) of FIGS. 6a and 6b. Execution then returns to Block B to determine if there is another training symbol T.

The general operation of Block G, as depicted in FIGS. 8a, 8b, and 9a-9e, is to check for and operate on one of a number of conditions that may exist as a result of the reduction of the Match List in Block F. Briefly, these conditions are: Reduced Match List Empty, T Not—Found in Reduced Match List, T Found—Alone in Reduced Match List, T Found—Best in Reduced Match List, and T Found—Not—Best in Reduced Match List. Each of these conditions, or cases, is now described in detail for an exemplary sequence of five, user-entered three stroke training symbols (T) given by 'A, A, H, H, H'.

Figure 9A:
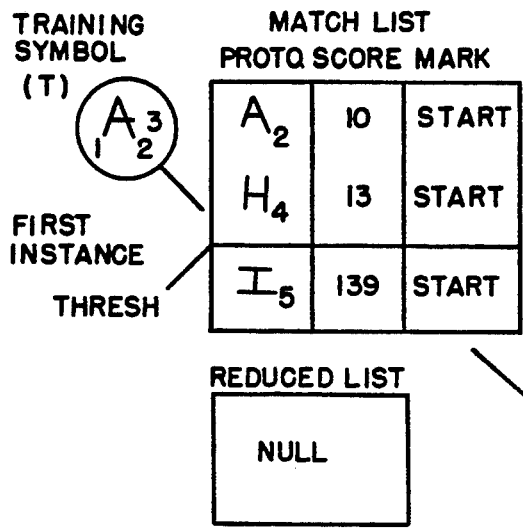

Reduced Match List Empty (FIG. 9a)

For the case of FIG. 9a, as a result of the execution of Block D of FIG. 7 three entries from S were matched to the Training Symbol (T), the first instance of the three stroke 'A'. It is noted that only a small portion of the prototype symbols in S are illustrated, it being realized that several hundred Starter symbol prototypes may initially be present.

The three matched entries are a three stroke label 'A' symbol prototype, marked Start(er), a three stroke label 'H' symbol prototype, marked Start, and a three stroke label 'I' symbol prototype, also marked Start. The three matched entries are loaded into the Match List with their respective Marks and Scores.

For the following examples it is assumed that Block F of FIG. 7 operates with both criteria described above. That is, the Reduced Match List contains no symbol prototypes from the Match List that have a Score greater than THRESH, and contains no symbol prototypes that are marked as Start(er). As a result, the I prototype is eliminated because of its relatively high Score. Furthermore, in that all of the prototypes of the Match List are marked as Start, the Reduced Match List is empty.

At Block G1 (FIG. 8a) the YES branch is taken to Block G2, causing T to be added to S and marked as User, as opposed to Starter. As a result, a three stroke User symbol prototype is added to S and is designated A$_6$, the 6 indicating the sixth symbol prototype of S. An Average Counter (CNT$_2$) that is associated only with User symbol prototypes is also initialized to one for A$_6$. The operation of CNT$_2$ is described in detail below. Briefly, CNT$_2$ is incremented only when the associated User symbol prototype is averaged, or otherwise combined, with T.

The method next exits Block G, and executes Blocks H and I of FIG. 7. At Block H the three Starter symbol prototypes having the same label as T (an 'A') have their associated counters (CNT$_1$) incremented by one, and at Block I all CNT$_1$ values are compared to THRESH$_1$. For this example it is assumed that THRESH$_1$=2. Therefore, no symbol prototypes are removed from S at this time.

Figure 9B:
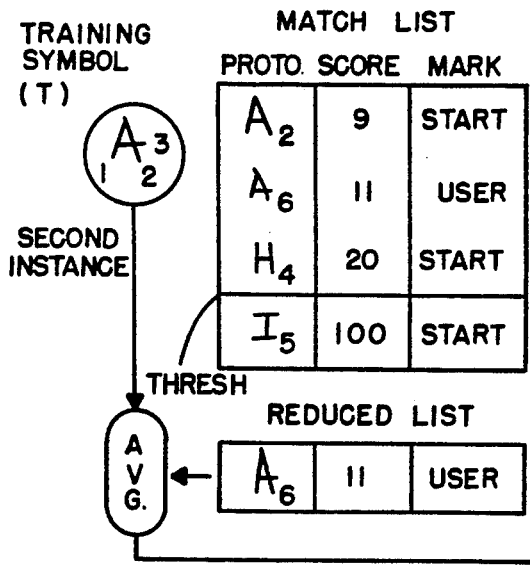

T Found—Alone in Reduced Match List (FIG. 9b)

For the second instance of 'A' the operation of Block D results in four symbol prototypes being placed into the Match List, including A$_6$. The operation of Block F results in only A$_6$ being placed into the Reduced Match List, in that A$_6$ is marked User and also has a Score<-THRESH.

If the NO branch is taken at Block G1 then Block G3 is executed, where a test is made to determine if a prototype having the label of T is found in the Reduced Match List. In that A$_6$ is present, the NO branch is taken to Block G4.

At G4 a test is made to determine if a prototype having the label of T is found alone in the Reduced Match List. That is, does the Reduced Match List contain a single symbol prototype of label T? For the example of FIG. 9b, the YES branch is taken to Block G5.

At G5 a test is made to determine if the Found Alone prototype is marked User and, if so, if the value of CNT$_2$ is less than a threshold THRESH$_2$. The value of THRESH$_2$ is set so as to prevent further averaging into the associated User symbol prototype after some predetermined number of averaging operations have already occurred, it being assumed that after THRESH$_2$ is exceeded that little additional improvement in the averaged symbol prototype will occur.

If NO at Block G5 then the method exits Block G. If YES at Block G5 then further averaging is permitted, and the method executes Block G6. At Block G6 T is averaged, or otherwise combined, with the single instance of the symbol prototype in the Reduced Match List, and the averaged T prototype replaces A$_6$ in S. This prototype is marked as User, to accommodate the case where Starter symbol prototypes are permitted in the Reduced Match List. At Block G7 the CNT$_2$ of A$_6$ is incremented by one, and the method then exits Block G.

At Block H of FIG. 7 the three Starter symbol prototypes having the same label as T (an 'A') have their associated counters (CNT$_1$) incremented by one, and at Block I all CNT$_1$ values are compared to THRESH$_1$. For this example it has been assumed that THRESH$_1$=2. Therefore, the three 'A' label Starter prototypes are deleted from S, and the remaining three prototypes designated H$_4$, I$_5$ and A$_6$ are redesignated as H$_1$, I$_2$, and A$_3$, respectively. As a result of the execution of Blocks H and I the set of prototypes in S is reduced in size by removing Starter symbol prototypes, thereby accomplishing an object of the invention.

T Not—Found in Reduced Match List (FIG. 9c)

For the first instance of the training symbol 'H' the operation of Block D results in three symbol prototypes being placed into the Match List, including the User symbol prototype $A_3$. For this example, it is assumed that $A_3$ has a lower (better) score than the Starter prototype $H_1$. The operation of Block F results in only $A_3$ being placed into the Reduced Match List, in that $A_3$ is marked User and also has a Score<THRESH.

Figure 8A:
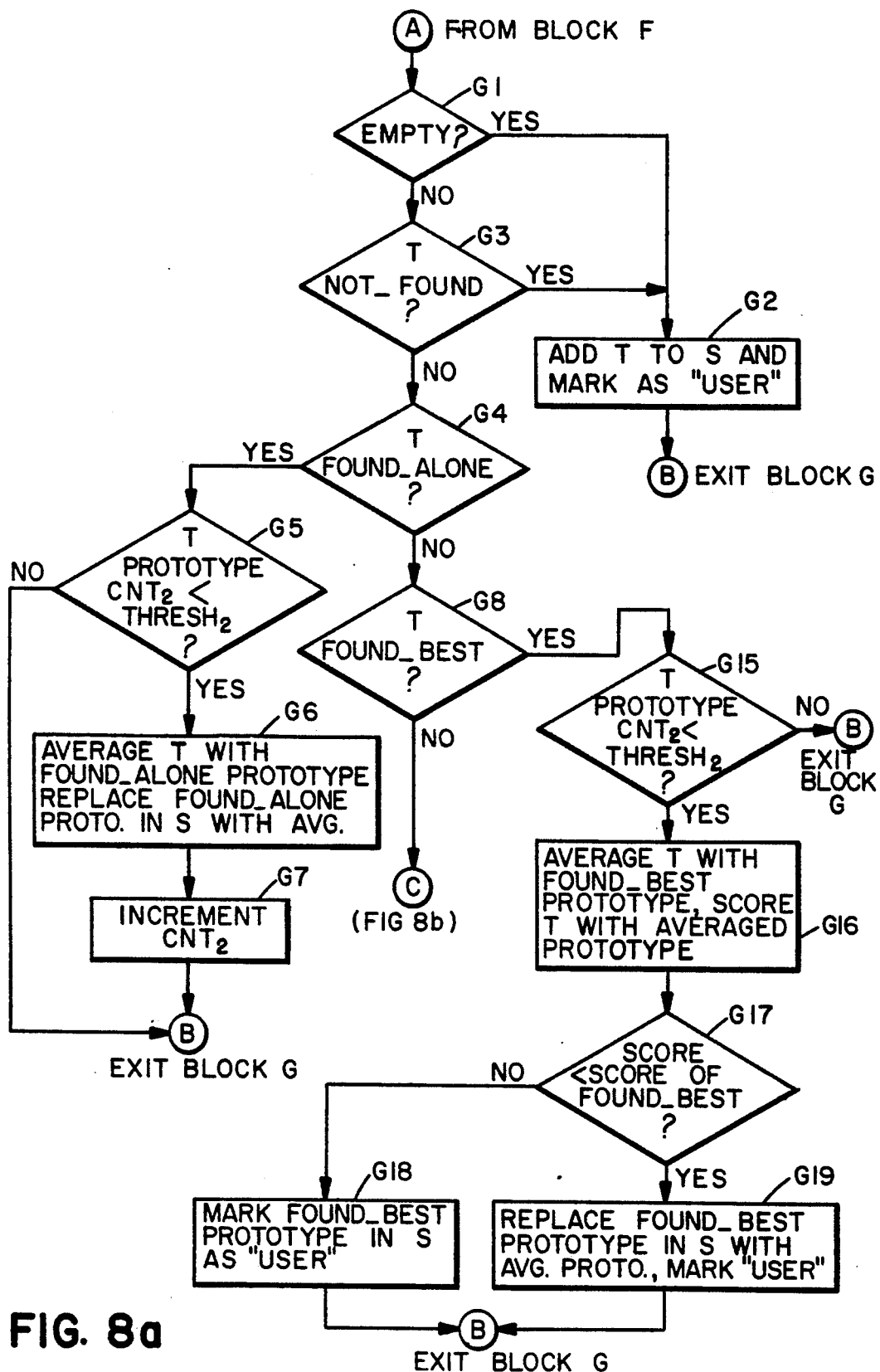
FIGS. 8a and 8b are flowcharts depicting in greater detail the step G of FIG. 7.

At Block G3 of FIG. 8a the YES path is taken, in that the Reduced Match List is not Empty, and also does not contain a symbol prototype of label 'H', the current training symbol (T) being processed. Block G2 is executed so as to place T into S as $H_4$. $H_4$ is marked User, and its associated $CNT_2$ is initialized to one.

The method then exits Block G, and executes Blocks H and I of FIG. 7. At Block H the single Starter symbol prototype having the same label as T ($H_1$) has its associated $CNT_1$ incremented by one, and at Block I all $CNT_1$ values are compared to $THRESH_1$. In that, for this example, $THRESH_1=2$, no symbol prototypes are removed from S at this time.

T Found—Not Best in Reduced Match List (FIG. 9d)

For the second instance of the training symbol 'H' the operation of Block D results in four symbol prototypes being placed into the Match List, including $A_3$, $H_1$ and $H_4$. For the purposes of this example it is assumed that $A_3$ again has a lower score than either of the 'H' symbol prototypes. The operation of Block F results in both $A_3$ and $H_4$ being placed into the Reduced Match List, in that both of these symbol prototypes are marked as User and also have a Score<THRESH. In that prototypes in the Reduced Match List are ordered by score, $A_3$ is placed before $H_4$.

Figure 8B:
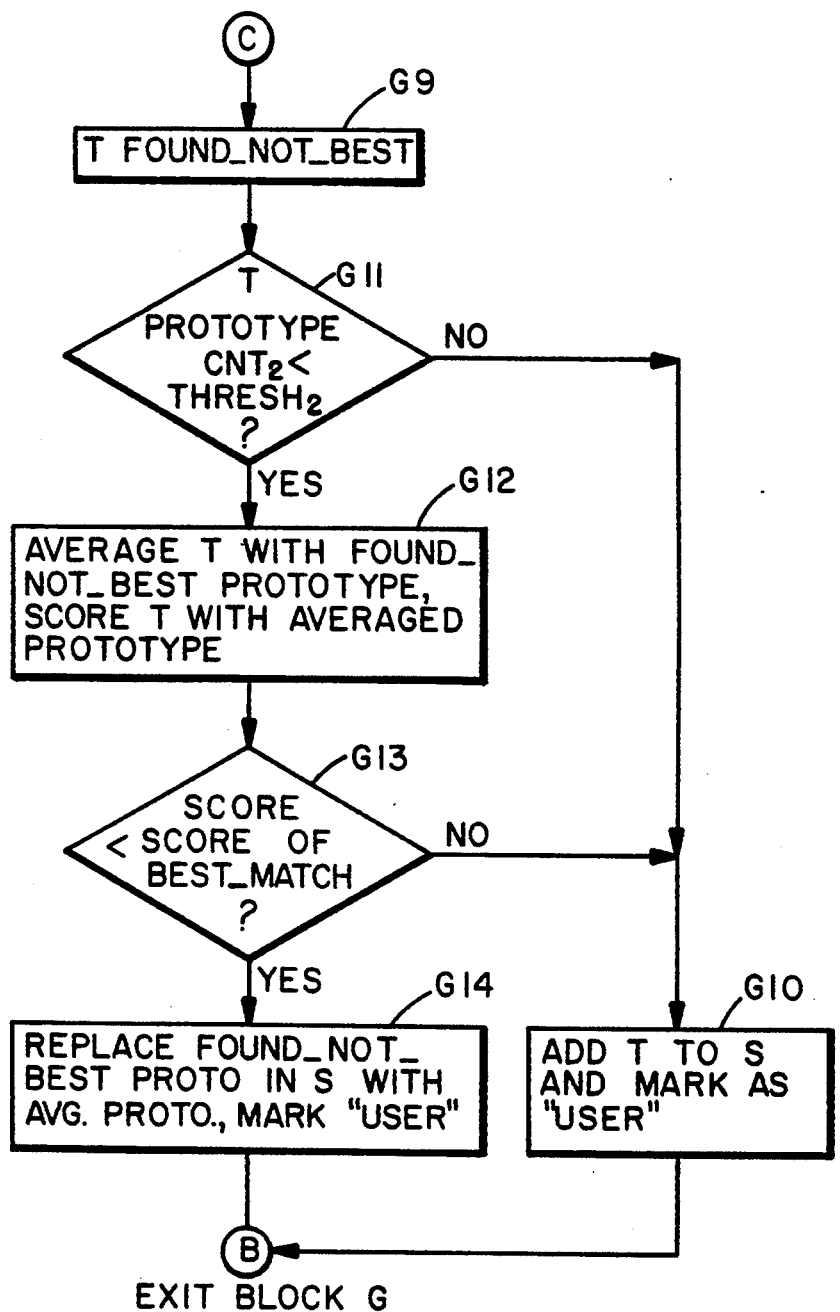

If the NO branch is taken at Block G1 then Block G3 is executed, where a test is made to determine if a prototype having the label of T is found in the Reduced Match List. In that $H_4$ is present, the NO branch is taken to Block G4. In that $H_4$ is not Found—Alone, the NO branch is taken to Block G8, where a determination is made if T is Found—Best in the Reduced Match List. In that $A_3$ is found in the Reduced Match List before $H_4$, the NO branch is taken to Block G9 (FIG. 8b). At Block G11 a test is made to determine if the Found—Not—Best prototype is marked User and, if so, if the value of $CNT_2$ is less than the threshold $THRESH_2$. If NO at Block G11 the method goes to Block G10, where T is added to S and marked user. This guarantees that T enters S and is not discarded. If YES, Block G12 is executed where T is averaged or otherwise combined with the highest scoring Found—Not—Best same label symbol prototype from the Reduced Match List. For this example T is averaged with $H_4$ (step 1) to generate an averaged symbol prototype '$H_{AVG}$'. Next, T is rematched with $H_{AVG}$ (step 2), using the elastic matching technique or some other suitable procedure, and a score is obtained ($SCORE_1$). At Block G13 a comparison is made to determine if $SCORE_1$ is less (better) than the score associated with the best choice in the Reduced Matching List, or $A_3$ for this example. If NO, T is added to S at Block G10 as $H_5$ (User). If YES at G13, then $H_4$ in S is replaced by $H_{AVG}$ (Block G14), $H_4$ is marked User, and the associated $CNT_2$ is incremented.

The method then exits Block G, and executes Blocks H and I of FIG. 7. At Block H the single Starter symbol prototype having the same label as T ($H_1$) has its associated $CNT_1$ incremented by one, and at Block I all $CNT_1$ values are compared to $THRESH_1$. In that, for this example, $THRESH_1=2$, the $H_1$ Starter symbol prototype is removed from S, the remaining prototypes are renumbered, and S appears as in FIG. 9e.

Figure 9E:
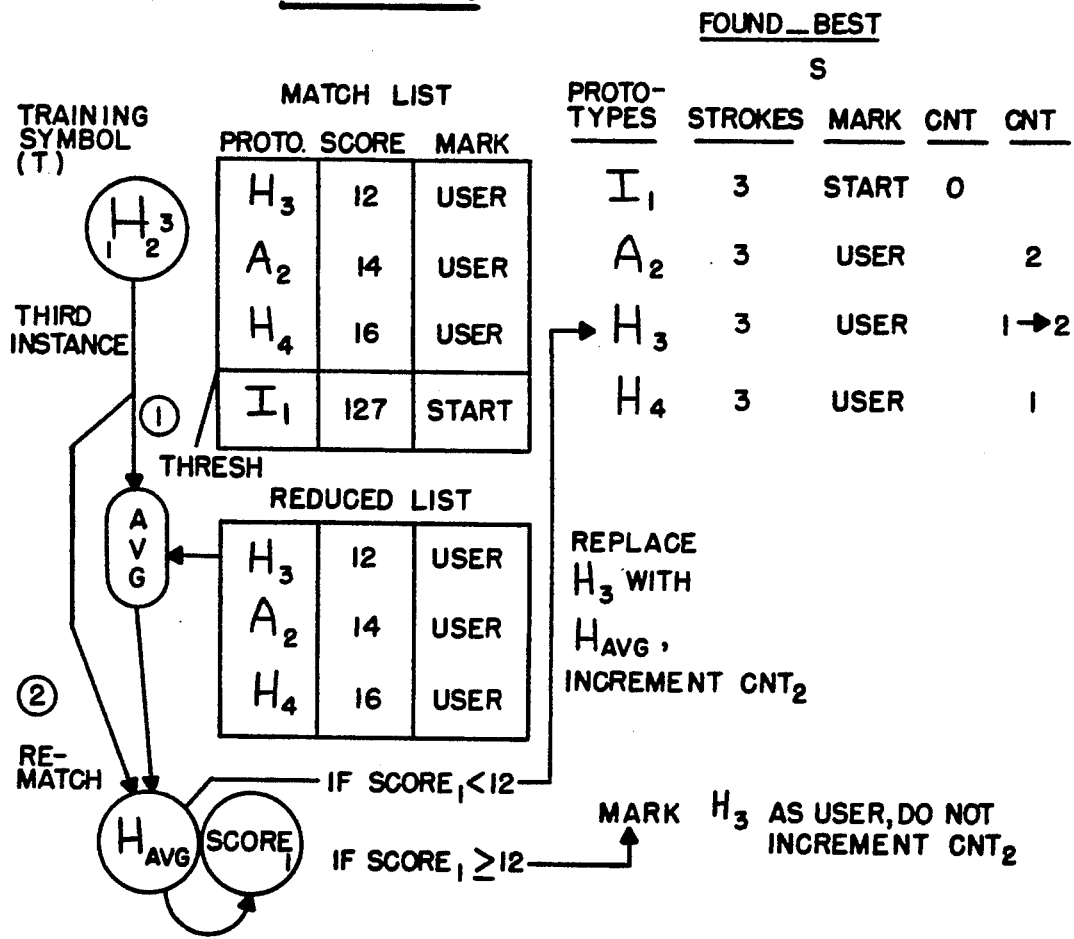

T Found—Best in Reduced Match List (FIG. 9e)

For the third instance of the training symbol 'H' the operation of Block D results in four symbol prototypes being placed into the Match List, including $H_3$, $A_2$, $H_4$ and $I_1$. For the purposes of this example it is assumed that $H_3$ has the lowest (best) score. The operation of Block F results in $H_3$, $A_2$, and $H_4$ being placed into the Reduced Match List, in that all of these symbol prototypes are marked as User and also have a Score<THRESH. In that prototypes in the Reduced Match List are ordered by score, $H_3$ is placed before $A_2$ and $H_4$.

In FIG. 8a, the NO branch is taken at Block G1 and Block G3 is executed, where the test is made to determine if a prototype having the label of T is found in the Reduced Match List. In that both $H_3$ and $_4$ are present, the NO branch is taken to Block G4. In that $H_4$ is not Found—Alone the NO branch is taken to Block G5, where the determination is made if T is Found—Best in the Reduced Match List. In that $H_3$ has the lowest (best) score this condition is satisfied, and the YES branch is taken to Block G15.

At Block G15 a test is made to determine if the Found—Best prototype is marked User and, if so, if the value of $CNT_2$ is less than the threshold $THRESH_2$. If NO at Block G15 the method exits Block G. If YES, Block G16 is executed where T is averaged or otherwise combined with the highest scoring (best) same label symbol prototype from the Reduced Match List. For this example T is averaged with $H_3$ (step 1 of FIG. 9e) to generate an averaged symbol prototype '$H_{AVG}$'. Next, T is rematched with $H_{AVG}$ (step 2), using the elastic matching technique or some other suitable procedure, and a score is obtained ($SCORE_1$). At Block G17 a comparison is made to determine if $SCORE_1$ is less (better) than the score associated with the Found—Best symbol prototype in the Reduced Match List, or $H_3$ for this example. If NO, $H_3$ is marked in S as User at Block G18, and the associated $CNT_2$ is not incremented. If YES at G17, then $H_3$ in S is replaced by $H_{AVG}$ (Block G19), $H_3$ is marked User, and the associated $CNT_2$ is incremented.

The method then exits Block G, and executes Blocks H and I of FIG. 7. At Block H no Starter symbol prototypes having the same label as T ('H') are found in S, and therefore none are removed at Block I.

Continued training of S occurs until a desired level of recognition accuracy is achieved. For the example provided above, with $THRESH_1=2$, if at least two instances of all cases of T are presented, then S will contain no symbol prototypes marked Starter. Furthermore, all User symbol prototypes will be either a combined, or averaged, symbol prototype or a representation of a single instance of the training symbol T.

It should be realized that it is within the scope of the invention to store more than one User set 26b of working prototypes, with a set being stored for each user of the system 10. As such, the "deletion" of the Starter symbol prototypes should be understood to be a deletion of the Starter prototype symbols from a specific User set 26b, and not the complete removal of the Starter set 26a from the system 10. That is, it may be preferable to always maintain a copy of the Starter symbol prototype set 26a so that a number of different users can be trained at various times.

An advantage of the immediate phase out method, wherein the $CNT_1$ threshold is set to one, is that the set of Starter symbol prototypes is quickly reduced, and the transition from the Starter set 26a to the working User set 26b is made rapidly. An advantage of the delayed phase out method, wherein the $CNT_1$ threshold is greater than one, is a maximization of a trade-off between prototype coverage and the number of prototypes.

However, both methods provide an appropriate evolution or transition from the Starter set 26a, having excellent "walk-up" recognition accuracy for a new user, to the working set 26b, having improved recognition accuracy tailored to a specific user. Both methods also generally provide a set of working symbol prototypes that is smaller in size than would be obtained if the entire Starter set of prototypes were also maintained.

It should be realized that the methods described may be practiced with a number of suitable hardware embodiments including but not limited to general purpose or dedicated processing devices and/or may be wholly or partially implemented with dedicated circuitry. As an example, the counters 36a-36c may be hardware counters, but are preferably maintained in software. Also, certain steps of the method may be performed in other than the order illustrated while still obtaining the same result. For example, the serially connected Blocks G1, G3, G4, G8, and G9 may be arranged in other than the order shown in FIGS. 8a and 8b.

It should further be realized that the teaching of the invention is not restricted to use only with handwriting character recognition systems, but is applicable in general to systems that train a set of User or application-specific prototype symbols from instances of training symbols applied to a Starter set of prototype symbols. Examples include, but are not limited to, scanned Optical Character Recognition (OCR) systems and handwriting recognition systems that recognize gestures, such as text editing symbols. By example, the gesture symbol is often used to indicate a deletion of a word or phrase from a body of text and, as such, conveys more meaning than a simple character such as 'A' or 'H'.

Also, it is within the scope of the invention to generate the training symbols T off-line, and to then enter them into the system as a group. The invention may also be practiced in parallel, global embodiments, instead of the serial, incremental embodiment described above.

Thus, while the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. A method of generating a User-specific set of prototype symbols for use in a symbol recognition system, comprising the steps of:
   (a) inputting an instance of a symbol to be recognized, the symbol having an identifying label;
   (b) comprising characteristics of the inputted symbol to members of a set comprised of Starter prototype symbols each having an associated identifying label; if the characteristics of the inputted symbol match characteristics associated with one or more Starter prototype symbols, to within a predetermined threshold,
   (c) combining the characteristics of the inputted symbol with the characteristics of a best matching one of the Starter prototype symbols that has a same identifying label as the identifying label of the inputted symbol, the step of combining operating to form a User prototype symbol having a same identifying label as the identifying label of the inputted symbol;
   (d) storing the User prototype symbol for subsequent use; and
   (e) deleting those Starter prototype symbols having the same identifying label as the User prototype symbol; otherwise, if the characteristics of the inputted symbol do not match characteristics associated with the one or more predetermined Starter prototype symbols, to within the predetermined threshold,
   (f) storing the inputted symbol as a User prototype symbol for subsequent use, the stored User prototype symbol having the same identifying label as the inputted symbol; and
   (g) deleting those Starter prototype symbols having the same identifying label as the User prototype symbol.

2. A method as set forth in claim 1 wherein each of the steps of deleting includes the initial steps of:
   incrementing a counter means that is associated with each individual one of the Starter prototype symbols that has a same identifying label as the identifying label of the inputted symbol;
   comparing a value of the counter means to a predetermined value; and
   if the value of the counter means is less than the predetermined value, repeating step (a) to input one or more strokes for representing another instance of the predetermined symbol or an instance of another predetermined symbol, and performing step (b), and steps (c) and (d) or step (f), without deleting the one or more Starter prototype symbols;
   otherwise, if the value of the counter means is equal to the predetermined value, performing the step (e) or (g) of deleting the one or more Starter prototype symbols.

3. A method as set forth in claim 1 wherein the step of combining includes a step of averaging the characteristics of the inputted symbol with the characteristics of a best matching one of the Starter prototype symbols that has a same identifying label as the identifying label of inputted symbol.

4. A method as set forth in claim 3 wherein the step of averaging employs a weighted average so as to more heavily weight a contribution of the characteristics of the best matching one of the prototype symbols to the resulting User prototype symbol.

5. A method as set forth in claim 1 wherein the step of inputting includes a step of generating one or more strokes by a movement of a stylus relative to an electronic tablet, and wherein the inputted symbol is comprised of one or more strokes.

6. A method as set forth in claim 5 wherein the step of comparing includes an initial step of performing an elastic matching technique between the stroke or strokes of the inputted symbol and a stroke or strokes of individual ones of the Starter prototype symbols.

7. Apparatus for generating a User-specific set of prototype symbols for use in a symbol recognition system, comprising:

means for inputting an instance of a symbol to be recognized, the symbol having an identifying label;

means for comparing characteristics of the inputted symbol to a set of prototype symbols comprised of Starter prototype symbols, each of the Starter prototype symbols having an associated identifying label;

combining means, responsive to a condition wherein the characteristics of the inputted symbol match characteristics associated with one or more Starter prototype symbols, to within a predetermined threshold, for combining the characteristics of the inputted symbol with the characteristics of a best matching one of the Starter prototype symbols that has a same identifying label as the identifying label of the inputted symbol, said combining means operating to form a User prototype symbol having the same identifying label as the identifying label of the inputted symbol;

means, responsive to said combining means forming a User prototype symbol, for storing the formed User prototype symbol within the set of prototype symbols for subsequent use;

said storing means being further responsive to a condition wherein said combining means does not form A User prototype symbol because the characteristics of the inputted symbol do not match characteristics associated with the one or more predetermined Starter prototype symbols, to within the predetermined threshold, for instead storing the inputted symbol within the set of prototype symbols as a User prototype symbol for subsequent use, wherein a stored User prototype symbol has a same identifying label as the inputted symbol; and means for deleting from the set of prototype symbols those Starter prototype symbols having the same identifying label as the User prototype symbol.

8. Apparatus as set forth in claim 7 wherein said deleting means includes;

means for incrementing first counter means that is associated with each individual one of the Starter prototype symbols that has a same identifying label as the identifying label of the inputted symbol; and means for comparing a value of the first counter means to a first predetermined value; and wherein said deleting means is responsive to the comparing means operation for deleting the one or more Starter prototype symbols only if the value of the associated first counter means is equal to the first predetermined value.

9. Apparatus as set forth in claim 7 wherein said combining means includes means for averaging the characteristics of the inputted symbol with the characteristics of the best matching one of the Starter prototype symbols that has a same identifying label as the identifying label of an inputted symbol.

10. Apparatus as set forth in claim 9 wherein said averaging means employs a weighted average so as to more heavily weight a contribution of the characteristics of the best matching one of the Starter prototype symbols to the resulting User prototype symbol.

11. Apparatus as set forth in claim 7 wherein said inputting means includes means for generating stroke information in response to a movement of a stylus relative to an electronic tablet, and wherein the inputted symbol is represented by information expressive of one or more strokes.

12. Apparatus as set forth in claim 11 wherein said comparing means includes means for performing an elastic matching technique between a stroke or strokes of the inputted symbol and a stroke or strokes of individual ones of the Starter prototype symbols.

13. Apparatus as set forth in claim 8 and further comprising:

second counter means that is associated with each individual one of the User prototype symbols for counting occurrences of the associated User prototype symbol being combined with an inputted symbol;

second comparing means for comparing a value of a second counter means to a second predetermined value; and wherein said combining means is responsive to the second comparing means operation for combining a User symbol prototype with an inputted symbol only if the value of the second counting means associated with the User symbol prototype is less than the second predetermined value.

14. A method of generating a User-specific set of handwriting prototype symbols for use in a handwriting recognition system, comprising the steps of:

establishing a prototype set S having as elements a plurality of predetermined Starter prototype symbols, each Starter prototype symbol having an associated identifying label;

inputting instances of training symbols T, each training symbol T having an associated identifying label;

for each instance of T, performing the steps of, matching the instance of T to the elements of S to obtain a Match List comprised of prototype symbols and corresponding scores, each score being indicative of a difference between the instance of T and the corresponding prototype symbol;

reducing the Match List to form a Reduced Match List in accordance with one or more criteria, wherein the Reduced Match List is comprised of from zero to a plurality of prototype symbols, each prototype symbol having a corresponding prototype symbol in the prototype set S;

processing the Reduced Match List to generate a User prototype symbol for inclusion within the prototype set S, the User prototype symbol having an associated identifying label; and removing from the prototype set S any Starter prototype symbols having a same label as the label of the instance of T.

15. A method as set forth in claim 14, wherein the step of reducing reduces the Match List by removing entries having a score that is greater than a first predetermined threshold.

16. A method as set forth in claim 14, wherein the step of processing includes a step of comparing the instance of T to elements of the Reduced Match List to identify one of the following cases:

an Empty case wherein the Reduced Match List does not contain a prototype symbol having a same label as the instance of T;

a Found—Alone case wherein the Reduced Match List contains a single prototype symbol having a same label as the instance of T;

a Found—Best case wherein the Reduced Match List contains a plurality of prototype symbols, and wherein a prototype symbol having a score that indicates a best match with the instance of T has a same label as the instance of T; and a Found_Not_Best case wherein the Reduced Match List contains a plurality of prototype symbols including at least one prototype symbol having a same label as the instance of T, and wherein a prototype symbol having a score that indicates a best match with the instance of T has a different label than the instance of T.

17. A method as set forth in claim 16 wherein for the Empty case, the method includes a step of adding the instance of T to the prototype set S marked as a User prototype symbol.

18. A method as set forth in claim 16 wherein for the Found_Alone case, the method includes the steps of:
   combining the instance of T with the single prototype in the Reduced Match List;
   replacing the corresponding symbol prototype in the prototype set S with the combined prototype symbol; and
   marking the combined prototype symbol in the prototype set S as a User prototype symbol.

19. A method as set forth in claim 16 wherein for the Found_Best case, the method includes the steps of:
   combining the instance of T with the prototype symbol in the Reduced Match List that has the score that indicates a best match with the instance of T;
   matching the instance of T with the combined prototype symbol and determining a score for the combined prototype symbol;
   comparing the score of the combined prototype symbol with the score of the prototype symbol in the Reduced Match List that has the score that indicates a best match with the instance of T; and
   if the score of the combined prototype symbol is less than the score of the prototype symbol in the Reduced Match List that has the score that indicates a best match with the instance of T, replacing the corresponding prototype symbol in the prototype set S with the combined prototype symbol and marking the replaced prototype symbol in S as a User prototype symbol; else
   marking the corresponding prototype symbol in the prototype set S as a User prototype symbol.

20. A method as set forth in claim 16 wherein for the Found_Not_Best case, the method includes the steps of:
   combining the instance of T with the prototype symbol in the Reduced Match List that has the same label as the instance of T;
   matching the instance of T with the combined prototype symbol and determining a score for the combined prototype symbol;
   comparing the score of the combined prototype symbol with the score of a prototype symbol in the Reduced Match List having the score that indicates a best match with the instance of T; and
   if the score of the combined prototype symbol is less than the score of the prototype symbol in the Reduced Match List having the score that indicates a best match with the instance of T, replacing the corresponding prototype symbol in the prototype set S with the combined prototype symbol and marking the replaced prototype symbol in S as a User prototype symbol; else
   adding the instance of T to the prototype set S as a User prototype symbol.

21. A method as set forth in claim 19 wherein the step of combining the instance of T with the prototype symbol in the Reduced Match List includes an initial step of comparing a value of a counter means that is associated with the corresponding prototype symbol in the prototype set S to a predetermined value, wherein the steps of combining, matching, and comparing are executed only if the value of the counter means is less than the predetermined value; and wherein the step of replacing the corresponding prototype symbol in the prototype set S with the combined prototype symbol includes a step of incrementing the counter means that is associated with the replaced prototype symbol.

22. A method as set forth in claim 20 wherein the step of combining the instance of T with the prototype symbol in the Reduced Match List includes an initial step of comparing a value of a counter means that is associated with the corresponding prototype symbol in the prototype set S to a predetermined value, wherein the steps of combining, matching, and comparing are executed only if the value of the counter means is less than the predetermined value; and wherein the step of replacing the corresponding prototype symbol in the prototype set S with the combined prototype symbol includes a step of incrementing the counter means that is associated with the replaced prototype symbol.

23. A method as set forth in claim 22 wherein if the step of comparing a value of the counter means to a predetermined value indicates that the value of the counter means is equal to or greater than the predetermined value, the method includes a step of adding the instance of T to the prototype set S as a User prototype symbol.

24. A method as set forth in claim 14 and further including a step of, for each instance of T, incrementing a counter means associated with all Starter prototype symbols in the prototype set S that have a same label as the instance of T, and wherein the step of removing from S any Starter prototype symbols having a same label as the label of the instance of T includes a step of comparing a value of the counter means to a predetermined value, and wherein the step of removing is executed only if the value of the counter means is equal to the predetermined value.

25. A method as set forth in claim 15, wherein the step of reducing the Match List includes a step of removing any entries marked as a Starter prototype symbol.

* * * * *

UNITED STATES PATENT AND TRADEMARK OFFICE
CERTIFICATE OF CORRECTION

PATENT NO. : 5,319,721

DATED : June 7, 1994

INVENTOR(S) : Chefalas et al.

It is certified that error appears in the above-indentified patent and that said Letters Patent is hereby corrected as shown below:

In col. 13, claim 1, line 64, the word "comprising" should read --comparing--.

Signed and Sealed this

Twenty-third Day of August, 1994

Attest:

BRUCE LEHMAN

Attesting Officer

Commissioner of Patents and Trademarks